Oct. 27, 1964
G. L. LOOMIS
3,153,845
METHOD AND APPARATUS FOR MAKING AND TESTING A PIPELINE
Filed Oct. 5, 1962
2 Sheets-Sheet 1
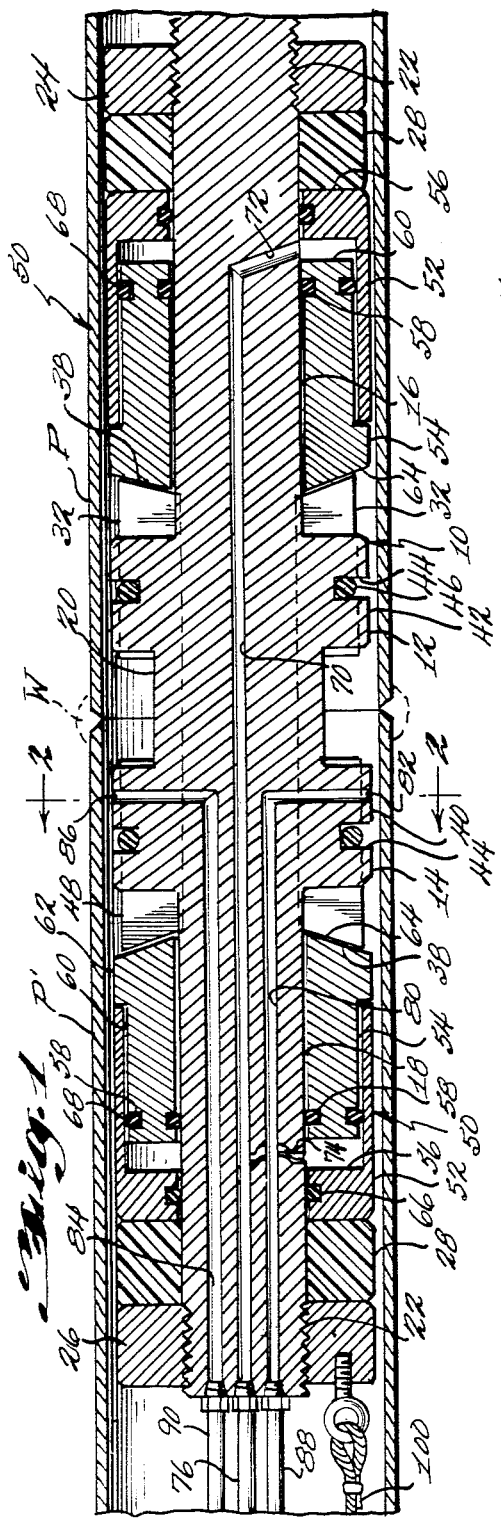
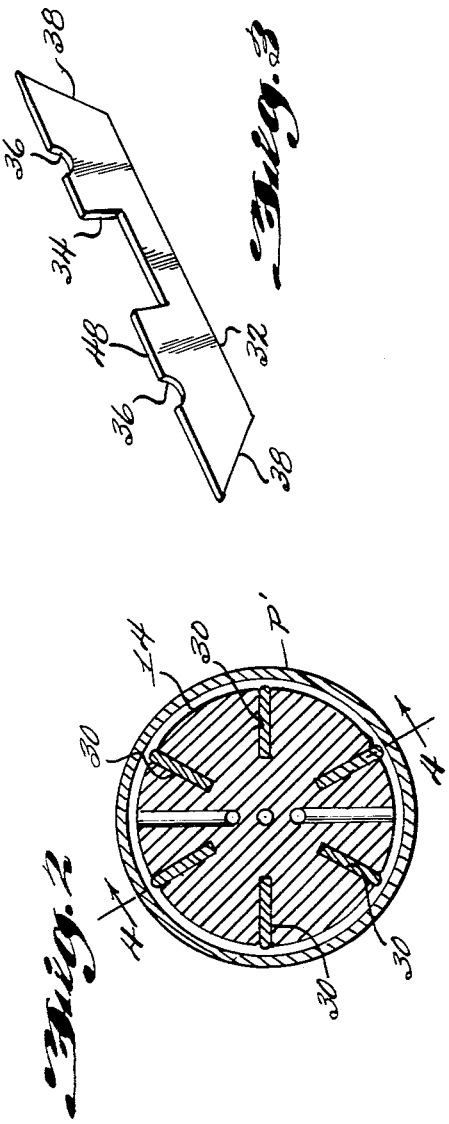
INVENTOR.
GLENN L. LOOMIS
BY
Cushman, Darby & Cushman
ATTORNEYS

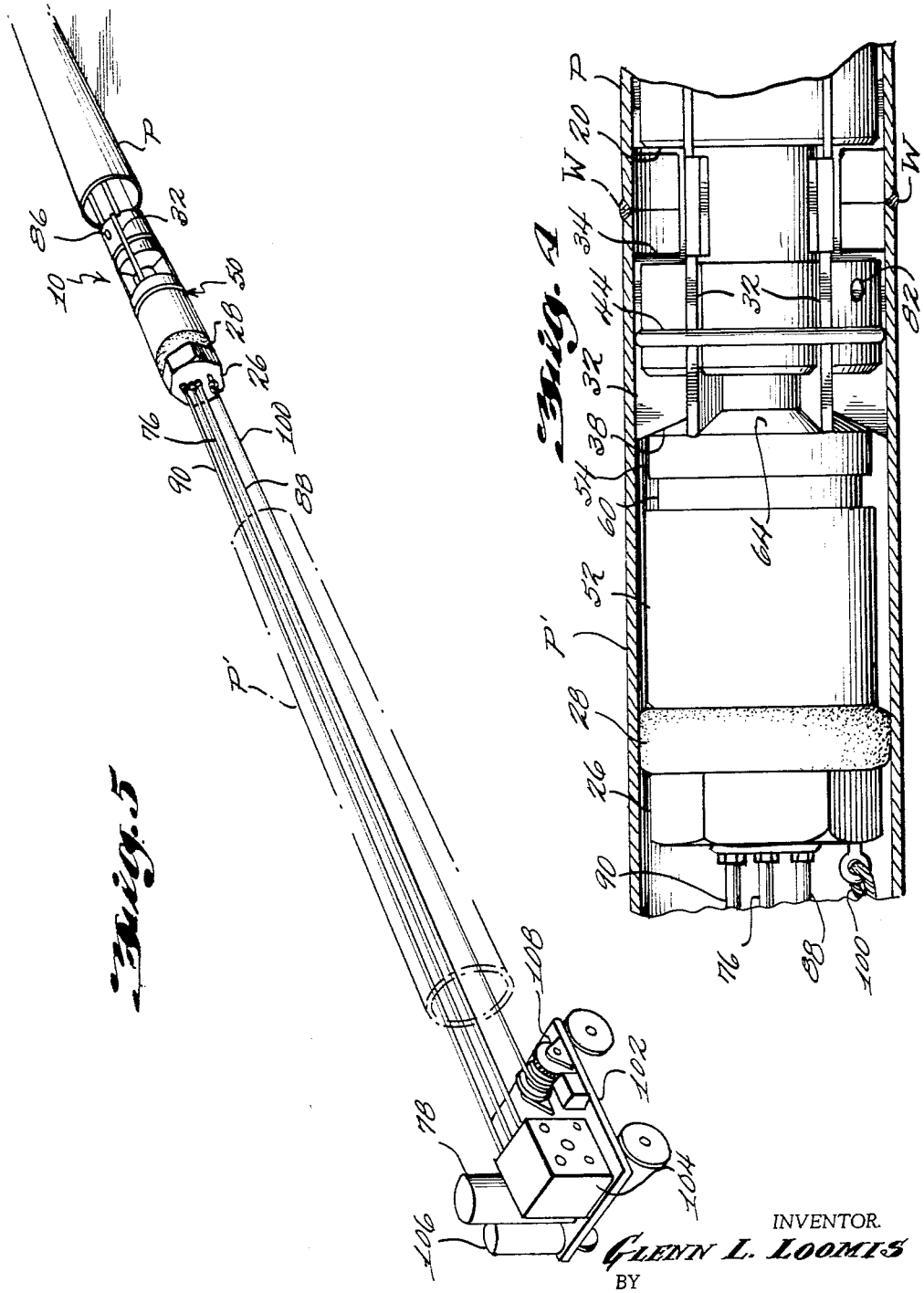

United States Patent Office 3,153,845
Patented Oct. 27, 1964

1

3,153,845
METHOD AND APPARATUS FOR MAKING AND
TESTING A PIPELINE
Glenn L. Loomis, P.O. Box 728, Pasadena, Tex.
Filed Oct. 5, 1962, Ser. No. 228,600
12 Claims. (Cl. 29—200)

The present invention relates to a method of making and testing a pipeline and the apparatus for accomplishing such method, and more particularly to an apparatus used in aligning and joining together and testing sections of pipe as the sections are laid in sequence.

Throughout the specification, the apparatus will be described in connection with the making up of a pipeline such as an oil, gas, water or the like pipeline used in the transmission and supply of fluids across terrain. However, it will be understood, the apparatus may be used in the completion of wells wherein flow tubing is assembled from sections in sequence and lowered into the well as assembled.

Heretofore, the laying of pipelines for the transmission of fluids such as oil, gas or water across great distances of terrain has been accomplished by joining together a multiplicity of pipe sections and laying such sections in a suitable trench and then covering the same. The joints of the sections were usually welded together although in some instances they have been joined by a threaded collar or threading of one pipe section into another. After a multiplicity of such sections had been joined, and prior to such sections being buried in the ground, it was necessary to test the sections to make sure that there were no leaks at the joints. This was accomplished by capping the ends between a multiplicity of sections of pipe, filling the length with water and then applying pressure thereto. Each joint was then individually observed for leaks. This prior process was slow and costly, as the pipeline could not be buried as it was made, but had to be left open until the welded joints had been tested; and, if they showed no leaks, then wrapped or proofed against corrosion. Men and equipment had to be backed down the pipeline sometimes many miles in rough terrain to check each of the joints of the length of pipe being tested and to perform the finishing operation of wrapping or proofing the joint against corrosion and burying the pipe. It is evident such an operation is time consuming and costly. In arid regions where water was difficult to obtain, the cost of using large quantities of water was prohibitive, especially if the pipelines were of large diameter.

An object of the present invention is to provide an improved apparatus for accomplishing such method which positively lines up the ends of two sections of pipe and permits the joining of sections of pipe and the testing of the sections in situ.

Still another object of the present invention is to provide an apparatus for aligning pipe sections, joining the pipe sections by welding, forcing the cooling of the weld and providing a test for the welded joint in situ.

A further object of the present invention is to provide an apparatus for aligning sections of pipe, joining the same together by welding, forcing the cooling of the welded joint with a first fluid and immediately testing the joint with a second fluid after the first fluid has been evacuated therefrom, the method and apparatus permitting testing by either sight inspection or observation

2 of a pressure drop on the fluid within the pipe between spaced barriers.

Still another object of the present invention is to provide an apparatus for laying and testing pipe which uses a minimum amount of liquid for testing each joint, the liquid being conserved and reused for the testing of each additional joint. This object is of considerable importance in arid regions and in the laying of pipe in cold climates where a high percentage of anti-freeze must be used with the testing fluid. Because of the high concentration of anti-freeze in the testing fluid and the small amount of testing fluid used, the method and apparatus of the present invention make it economically feasible to lay pipe in frigid weather.

Another object of the present invention is to provide an improved apparatus capable of use in aligning the ends of sections of pipe and, further, capable of testing the joint made between the sections of pipe after the ends have been aligned.

These and other objects and advantages of the present invention may be more fully realized by reference to the accompanying specification, claims and drawings in which:

FIGURE 1 is a vertical sectional view through the end portion of two sections of pipe, the figure illustrating the apparatus of the present invention inserted into the pipe and in a static position;

FIGURE 2 is a vertical sectional view taken on the line 2—2 of FIGURE 1;

FIGURE 3 is a perspective view of one of the aligning blade members of the apparatus illustrated in FIGURE 1;

FIGURE 4 is a fragmentary sectional view taken substantially on the line 4—4 of FIGURE 2, but with the view illustrating the apparatus of the present invention in its operative position of aligning the sections of pipe and ready for the accomplishment of the test of the joint made between the two aligned sections of pipe; and FIGURE 5 is a schematic perspective view illustrating the operation of the present invention.

Referring to the drawings wherein like character and reference numerals represent like or similar parts, the apparatus of the present invention is best disclosed in FIGURES 1 through 4 inclusive. The apparatus, which is generally designated by the numeral 10, is provided with an elongated body member 12 having an enlarged substantially cylindrical center portion 14 from which extend end portions or stems 16 and 18 of reduced diameter. The center portion 14 of the elongated body member 12 has a diameter which is less than the inside diameter of the well pipe in which the apparatus is being used. In addition, the center portion is provided with an annular groove or recess 20. Each of the end portions 16 and 18 are threaded as indicated at 22 for receiving nuts or abutments 24 and 26 respectively.

A resilient packer element 28 is carried on each of the stems 16 and 18 and abuts against the nuts 24 and 26 respectively. The packer elements 28 are made of elastomeric material such as rubber, synthetic rubber, or the like, so that they can be compressed longitudinally against the respective abutments or nuts 24 and 26 and then expand transversely into sealing engagement with the interior wall of the end portions of pipe sections P and P'.

The center portion 14 of the body member 12 is provided with a plurality of longitudinally-extending slots 30. As best shown in FIGURE 2, the slots 30 are angularly spaced from one another and each lies substantially in a radius of the body member 12. The slots 30 are adapted to receive elongated blade members 32. Each blade member 32 is provided with a cutout portion 34 which is adapted to substantially align with the annular groove 30 when the blades are in their retracted or static position. In addition, each blade member 32 is provided with arcuate cutouts 36 spaced outwardly of the cutout 34. The ends of each blade member 32 are tapered toward each other as indicated at 38.

As mentioned above, the center portion 14 of the body member 12 is provided with the annular cutout 20, and this cutout divides the center portion into two lands 40 and 42, each land having an annular groove 44. When the blades 32 are positioned in the slots 30, they have a length such that each end of each blade extends beyond the respective ends of the lands 40 and 42. In addition, the annular grooves 44 in the lands 40 and 42 align with the arcuate cutouts 36. A resilient retaining band 46, carried in each of the grooves 44, rests in the arcuate cutouts 36 of the blades 32 and retains the blades 32 in their innermost or retracted position so that their outer planar edge portion 48 is below the outer periphery of the lands 40 and 42. The retaining bands 46 as shown may be O-rings, but they could be coil springs or snap rings.

Interposed between the tapered ends 38 and the packer elements 28 are counterpoised differential piston members 50. Each piston member 50 includes a pair of piston elements 52 and 54, slidable on the end portions or stems 16 and 18 respectively. The piston element 52 is cup shaped and has a head 56 and a skirt 58, the skirt 58 telescoping a portion of the piston element 54. The piston element 54 is provided with a reduced portion 60 upon which the skirt 58 of piston element 52 slides and a head 62 having a conical surface 64 which is adapted to mate with and engage the tapered ends 38 of the blade members 32. Suitable O-rings 66, provided on the head 56 of the piston element 52 and on the reduced portion 60 of the piston element 54, provides a seal between the respective elements and the stem or end portions 16 and 18. Also an O-ring 68 is provided between the skirt 58 and the reduced portion 60 to provide a seal therebetween when the two piston elements 52 and 54 move relative to one another and relative to the end portions 16 and 18.

In order to actuate the counterpoised differential piston member 50, the body member 12 is provided with a passageway 70 having a laterally-extending passage 72 opening between the head 56 and reduced portion 60 of one piston member 50 and a second passage 74 opening between the head 56 and reduced portion 60 of the other piston member 50. The passageway 70 is connected by a conduit 76 to a suitable source 78 of liquid under pressure and, when liquid is flowed through conduit 76 into the passage 70, it will cause the cup-shaped piston element 52 to move against the packer element 28 whereas the other piston element 54 moves away from the cup-shaped element 52 toward the blade members 32. The conical end 64 of the piston element 54 engages the tapered ends 38, and it will now be obvious that the two piston elements 54 moving toward one another will cause the respective blade elements 32 to move radially outwardly into engagement with the interior of the pipe. The action of the counterpoised differential piston members is substantially simultaneous so that the packer elements 28 are substantially simultaneously set against the interior wall of the pipe with the outward movement of the blade members 32.

Body member 12 is provided with a passageway 80 extending through and to the center portion 14. The passageway 80 opens laterally on the peripheral surface of the land 40, as indicated at 82. A second passageway 84 is provided in the body member 12, the passageway 84 opening on the land 40 as indicated at 86. It will now be noted that the openings or ports 82 and 86 are diametrically opposite each other, and the purpose of providing such ports in this pipe will be explained in more detail later in the specification. Passageways 80 and 84 are respectively connected to the flexible conduits 88 and 90 respectively, the purpose of which will also be explained in more detail later on in the specification. While the passageways 70, 80 and 84 are illustrated for convenience in parallel spaced relationship to each other, it is of course within the scope of the present invention that such passageways could be made concentric with one another.

Referring now to FIGURE 5, the operation of the apparatus in conjunction with the method of the present invention will now be described. The apparatus 10 is shown with half of it inserted into the end of a previously-laid section of pipe P. The conduits 76, 88 and 90 as well as a suitable cable 100, are threaded through the next section of pipe P' to be attached to the pipeline. The conduits 76, 88 and 90 are coupled to the apparatus 10 as well as the cable 100 and then the pipe P' is generally moved to a position where its end is close to the free end of the previously-laid section of pipe P'. When in this position, the section of pipe P' will receive in its end the portion of the testing apparatus 10 which is shown exposed in FIGURE 5.

The next step in the process is to accurately align the end of the section of pipe P' with the end of the previously-laid section of pipe P. The alignment is accomplished by flowing a fluid under pressure from the source 78 through the conduit 76 into the body of the tester apparatus and discharging the same within the counterpoised differential pistons 50. The source 78 may be a tank of water or other liquid carried on a dolly 102, the water being supplied through a suitable control unit 104 which includes valves, a pump and suitable pressure gauges. By applying liquid under pressure through the conduit 76 and passageway 70, the piston elements 52 and 54 of each of the pistons 50 move away from each other causing the packer elements 28 to be compressed and expand longitudinally into sealing engagement with the interior of the sections of pipe P and P' and also causing all of the blade elements 32 to simultaneously move radially outwardly into engagement with the interior wall of each section of pipe P and P'. Since the radial movement of the blade members 32 is accurately controlled by the piston elements 54, they will adjust and align the ends of the pipe.

After the ends of the pipe have been aligned, a weld W is made to form the joint between two sections of pipe. By providing the groove 20 in the center portion 14 of the body member 12, as well as the cutouts 34 in each of the blade members 32, the heat from welding the ends of the pipe sections does not affect the apparatus.

Once the weld has been completed, and with the packers 28 still set and the blade members 32 still in engagement with the respective end portions of the pipe sections P and P', compressed air from a suitable source of compressed air 106 is permitted to flow through the conduit 90 into the passageway 84 where it is discharged through the port 82 into the space between the sealed-off packer elements 28. The conduit 88 at this time is open to atmosphere so that the cool air flowing through the passageway 84 is discharged from the opening or port 86 adjacent the hot weld and is allowed to circulate therein and be discharged as it is heated up through the passageway 80 and conduit 88 to atmosphere.

Immediately after the weld W has cooled, the compressor or source of compressed air 106 is stopped and, by suitable valves on the control unit 104, the conduit 90 is opened to atmosphere. Conduit 88 is then connected to the source of liquid 78, and liquid is pumped through the conduit 88, passageway 80 and discharged into the port 82. As liquid fills up the space between the set packer elements 28, the air in that space will be discharged through the opening 86 into the passageway 84, conduit 90 to atmosphere. When it is determined that the space between the packers is completely filled with the liquid, then a valve on the control unit 104 is operated to close the conduit 90, and pressure is applied to the liquid discharging from the conduit 88, passageway 80 and this pressure is either measured on a gauge to see if there is a pressure drop indicating a leak or the operator visually inspects the weld W to see if liquid is leaking therethrough. Once it has been determined that the weld W is satisfactory, then the conduit 90 is again connected to the source of compressed air 106 and the conduit 88 through suitable valves in the control unit 104 is placed in open communication with the source of liquid 78. Compressed air flowing through the conduit 90, passageway 84 and port 86 forces the liquid out of the space between the sealed-off packer elements 28 through the port 82, passageway 80 and conduit back into the source of supply where it may again be used for a subsequent test. After all the liquid has been removed from between the set packer elements 28, the pressure on the fluid in conduit 76 is released so that the packer elements relax and the piston elements 52 and 54 of the piston members 50 retract. A suitable winch 108 is then used to draw the apparatus by cable 100 through the pipe just connected to a position where it extends halfway out of the free end of this newly-attached section of pipe and then the conduits 76, 88 and 90, as well as the cable 100, are detached from the apparatus and threaded through the next section of pipe to be attached to the pipeline.

If gas is used instead of liquid to test the weld W, by suitable manipulation of valves in the control unit 104, gas can be flowed through the lines 88 or 90 to fill the space between the set packers 28. Of course, the gas will have to be raised to a suitable test pressure and then the weld W will have to be coated with a soap solution or the like so that a visual observation for leaks can be made. If there are bubbles present, then, of course, there is a leak. On the other hand, if there are no bubbles present after the soap solution has been applied to the weld W, then the weld provides a safe joint.

While the objects and advantages of the present invention have been fully and effectively accomplished by the method and apparatus described and illustrated in the drawings, it will be understood that the invention is susceptible to some slight modifications without departing from the spirit and principle thereof.

Therefore, the terminology used throughout the specification and the illustrations of the drawings are for the purpose of description and not limitation, the scope of the invention being defined in the appended claims.

What is claimed is:

1. In an apparatus for lining up sections of pipe and testing a joint made between the sections after the sections have been lined up: an elongated body member having a smaller diameter than the inside diameter of the sections of pipe, at least one settable packer element mounted on each end portion of said body member, said body member having a plurality of longitudinally extending slots in its periphery intermediate said packer elements, an elongated rigid blade member carried in each of said slots and movable therein outwardly of the body member, means for setting said packer elements into sealing engagement with the interior wall of opposed end portions of the sections of pipe and moving said blade members outwardly into engagement with the interior wall of said pipe sections, and means to supply fluid under pressure to the space between said packers after the same are set and the sections have been joined.

2. In an apparatus for lining up sections of pipe and testing a joint made between the sections after the sections have been lined up: an elongated body member having a smaller diameter than the inside diameter of the sections of pipe, at least one settable packer element mounted on each end portion of said body member, said body member having a plurality of longitudinally extending slots in its periphery intermediate said packer elements, an elongated rigid blade member carried in each of said slots and movable therein outwardly of the body member toward the interior wall of the opposed end portions of the sections of pipe; means for setting said packers in sealing engagement with the interior wall of the opposed end portions of the sections of pipe and simultaneously moving said blade members outwardly into engagement with the interior wall of the opposed end portions of the sections of pipe; means including a first passageway in said body for supplying a first fluid to the space between said packers when said packers are set; and means including a second passageway through said body for supplying a second fluid under pressure to the space between said packers after the same are set and the sections have been joined.

3. The apparatus of claim 2 wherein said first passageway has an opening to the exterior of said body member which is diametrically opposite the said second passageways opening to the exterior of said body member.

4. The apparatus of claim 2 in which said means for simultaneously setting said packer elements and moving said blade members outwardly includes a counterpoised differential piston member cooperating with one packer element and one end of each of said blade members and a second counterpoised differential piston member cooperating with the other packer element and the opposite end of each of said blade members.

5. In an apparatus for lining up sections of pipe and testing a joint made between the sections after the sections have been lined up: an elongated body member having an enlarged center portion and longitudinally extending reduced end portions; at least one resilient packer element mounted on each of the end portions; means on each end portion abutting said packer elements to retain and limit the longitudinal movement of the same; said enlarged center portion having a diameter less than the inside diameter of the sections of pipe and a plurality of angularly-spaced longitudinal slots therein; a rigid blade member carried in each of said slots and movable therein outwardly of the body member toward the interior wall of the opposed end portions of the sections of pipe, each blade member having tapered ends, a counterpoised differential piston member carried on each reduced end portion of said body member, fluid pressure means to actuate each of said counterpoised differential piston members to cause the same to compress the packer elements longitudinally against said abutting means and expand the same transversely into sealing engagement with the interior of the sections of well pipe and to engage the tapered ends of said blade members to urge the same outwardly into engagement with the interior wall of the end portions of said sections of well pipe, a first fluid passage extending through said body and having an opening on the periphery of the center portion thereof and a second fluid passage extending through said body and having an opening on the periphery of the center portion thereof.

6. The apparatus of claim 5 in which the opening of the first fluid passage is diametrically opposite the opening of the second fluid passage.

7. The apparatus of claim 5 in which said fluid pressure means includes a fluid passageway through said body member having lateral passages opening adjacent each of said piston members.

8. The apparatus of claim 5 in which each counterpoised differential piston member includes two piston elements movable in opposite directions on the reduced end portion of said body member to respectively engage the packer element and the end of each of said blade members.

9. The apparatus of claim 8 in which the piston element engaging the end of each of said blade elements includes a conical surface mating with the tapered surface of the ends of the blade members.

10. The apparatus of claim 8 in which the center portion of said body member is provided with an annular groove therein and in which each of said blade members is provided with a cutout portion which substantially mates with the annular groove when the blade members are in their innermost position.

11. The apparatus of claim 5 in which said longitudinal slots in said center portion also extend radially of said center portion and in which said blade members move radially outwardly and inwardly.

12. The apparatus of claim 11 including means to normally urge said blade members inwardly of said longitudinal slots.

References Cited by the Examiner

UNITED STATES PATENTS

| | | | |
|---|---|---|---|
| 1,977,987 | 10/34 | Corby | 29—407 |
| 2,227,295 | 12/40 | Cope | 29—200 |
| 2,495,544 | 1/50 | Peterson et al. | 29—200 |
| 2,503,190 | 4/50 | Branson | 29—407 |
| 2,807,955 | 10/57 | Loomis | 73—40.5 |
| 2,951,362 | 9/60 | Dean et al. | 73—40.5 |

WHITMORE A. WILTZ, *Primary Examiner.*

THOMAS H. EAGER, *Examiner.*